May 9, 1967     E. TRONSLIEN     3,318,169
COMBINATION GEAR AND BEARING DEVICE IN DIALS
Filed Feb. 9, 1965
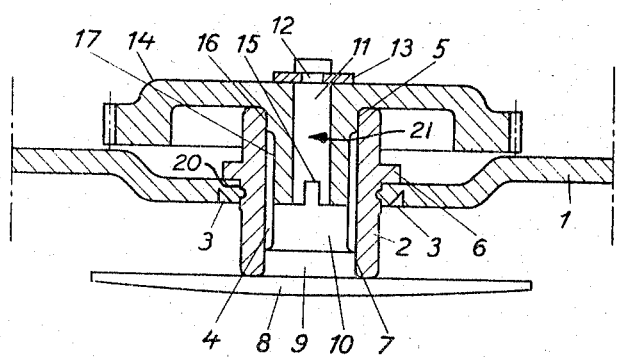
INVENTOR.
ERLING TRONSLIEN
BY Hane and Nydich
ATTORNEYS

United States Patent Office 3,318,169
Patented May 9, 1967

3,318,169
COMBINATION GEAR AND BEARING DEVICE IN DIALS
Erling Tronslien, Tyreso, Sweden, assignor to Telefonaktiebolaget LM Ericsson, Stockholm, Sweden, a corporation of Sweden
Filed Feb. 9, 1965, Ser. No. 431,254
Claims priority, application Sweden, Feb. 20, 1964, 2,034/64
5 Claims. (Cl. 74—432)

The present invention refers to telephone dials and concerns especially the main shaft mounted in a bushing in the frame of the dial and connecting the finger wheel with a main gear located inside the dial.

In dials as now known the bushing is generally mounted in a hole in the frame and fixed thereto by swaging material of the frame along the edge of the hole, so that the bushing is fastened by constriction of the hole. This arrangement, however, has the disadvantage that the bushing is also deformed to a certain extent, which makes it necessary to ream the bearing hole of the bushing after the swaging operation to avoid biting of the shaft in the bearing.

This reaming of the bushing which constitutes an additional operational step in the manufacture, is avoided according to the invention in that the shaft comprises two journals that are joined together, an outer one being connected to the finger wheel and an inner one connected to the main gear, and that each journal is rotatably supported at the respective end portion of the bushing and has along the portion between the bearing portion and the shaft joint a diameter that is smaller than the inner diameter of the bushing, so that a substantially cylindrical cavity is formed between the bushing and the shaft.

The advantage of this device is especially significant when the shaft is manufactured of plastic material by transfer molding. In this case one can make each journal in one piece with the part that is to be connected to the journal and thereby obtain sufficient exactness in the diameter of the journal so that said journal will fit exactly in the bearing without any grinding of the same. The inner journal in such a case is made in one piece with the main gear while the outer one is provided at its outer end with a flange or disc which is so designed that a finger wheel may be mounted on the same in a simple manner.

The invention will be further described by means of an embodiment with reference to the single figure of the attached drawing which shows the device of the invention in cross section.

A bushing 2 is provided in a hole 20 in a frame 1 of a dial. This bushing serves as a bearing for a shaft 21 which on the inside of the frame carries a gear 14 and on the outside of the frame a support flange or disc 8 for carrying a finger wheel (not shown).

The bushing 2 is provided with a circular collar 6 which rests against the inside of the frame, and is fastened to the frame by swagings or stavings 3 of the material around the hole edge. These stavings cause the material of the hole edge to press against the bushing, whereby this latter is deformed so that the inner diameter of the bushing at the fastening point is somewhat smaller than at the end portions of the bushing.

Shaft 21 joining gear 14 to disc 8 is formed by a hub 17 integral with the gear and extensions 9, 10 and 11 integral with the disc and each other. Hub 17 is externally widened at 16 to define a journal journalled in an end 5 of the bushing 2 and disc extension 9 defines a second journal at an end 7 of the bushing. Disc extension 10 and the non-widened part of the hub, in conjunction, define a cylindrical space 4 between the bushing and the shaft. Extension 11 protrudes through a central bore of hub 17 and is secured against axial displacement by a locking washer 13 engaging a recess 12 at the end of extension 11. Rotation of gear 14 and support disc 8 in reference to each other is prevented by a lug 15 extending from extension 10 and engaging a corresponding recess in hub 17.

By a suitable dimensioning of the disc 8 which together with the corresponding journal is made of a plastic material of suitable elasticity, a resilient mounting base for the finger wheel of the dial is obtained.

I claim:
1. A bearing assembly for a dial of a telephone set, said assembly comprising in combination; a dial frame including a bore; a finger wheel support member; a driving gear; a bearing bushing extending through said bore in the frame secured thereto and protruding from both sides of the frame; and a shaft, said shaft mounting on one end said support member and on the other end said gear and defining a journal at each end, said journals being journalled in said bushing at opposite ends thereof, the shaft portion intermediate said journals having an outer diameter less than the inner diameter of said bushing to define an annular space between the bushing and the shaft.

2. A bearing assembly according to claim 1, wherein said gear has a hub extending into said bushing, said hub constituting a shaft portion and defining on its outer wall one of said journals.

3. A bearing assembly according to claim 2, wherein said hub has a central bore and said finger wheel support member has an extension constituting another shaft portion and having a part protruding through said hub bore, said part being secured against axial displacement in reference to the gear, and said other shaft portion defining the other journal.

4. A bearing assembly according to claim 3 and comprising locking means locking said other shaft portion to said gear hub to prevent rotation of the shaft in reference to the hub.

5. A bearing assembly according to claim 1, wherein said finger wheel support member and a shaft portion defining the journal adjacent to said support member are made of elastic material.

No references cited.

DAVID J. WILLIAMOWSKY, *Primary Examiner.*

L. H. GERIN, *Assistant Examiner.*